United States Patent [19]

Aaltonen

[11] Patent Number: 6,105,538

[45] Date of Patent: Aug. 22, 2000

[54] WASTE HEAT BOILER WITH VARIABLE OUTPUT

[75] Inventor: Pasi Aaltonen, Rauma, Finland

[73] Assignee: Aalborg Industries A/S, Aalborg, Denmark

[21] Appl. No.: 09/284,812

[22] PCT Filed: Oct. 23, 1997

[86] PCT No.: PCT/FI97/00640

§ 371 Date: Jun. 18, 1999

§ 102(e) Date: Jun. 18, 1999

[87] PCT Pub. No.: WO98/17948

PCT Pub. Date: Apr. 30, 1998

[30] Foreign Application Priority Data

Oct. 24, 1996 [FI] Finland ................................. 964281

[51] Int. Cl.⁷ .............................. F22B 23/06; F22B 37/10
[52] U.S. Cl. ................... 122/367.1; 122/7 R; 122/451 R
[58] Field of Search ............................ 122/367.1, 367.2, 122/367.3, 451 R, 451 S, 451.1, 451.2, 7 R

[56] References Cited

U.S. PATENT DOCUMENTS

| | | |
|---|---|---|
| 695,325 | 3/1902 | Moran . |
| 1,038,004 | 9/1912 | Seddon . |
| 2,222,349 | 11/1940 | Jones ................................... 122/451.1 |
| 3,070,077 | 12/1962 | Huet ....................................... 122/451 |
| 3,162,180 | 12/1964 | Arisawa ................................. 122/451 |
| 3,441,006 | 4/1969 | Disley et al. ............................ 122/7 |
| 4,194,468 | 3/1980 | Augsburger ........................ 122/406.5 |
| 5,476,525 | 12/1995 | Bekedam . |
| 5,522,348 | 6/1996 | Tanaka et al. ....................... 122/367.1 |
| 5,791,299 | 8/1998 | Matsuo et al. ...................... 122/367.1 |

FOREIGN PATENT DOCUMENTS

| | | |
|---|---|---|
| 22701 | 12/1917 | Denmark . |
| 0051078A1 | 5/1982 | European Pat. Off. . |
| 0202967A1 | 11/1986 | European Pat. Off. . |
| WO 9616298A1 | 5/1996 | European Pat. Off. . |
| 64978 | 10/1983 | Finland . |
| 2540973A1 | 8/1984 | France . |
| 152917 | 7/1904 | Germany . |
| 266911 | 11/1913 | Germany . |
| 508397 | 9/1930 | Germany . |
| 1 038 563 | 9/1958 | Germany . |
| 133777 | 12/1951 | Sweden . |
| 1154511A | 5/1985 | U.S.S.R. . |
| 1123482 | 8/1968 | United Kingdom . |

*Primary Examiner*—Denise L. Ferensic
*Assistant Examiner*—Jiping Lu
*Attorney, Agent, or Firm*—Seed IP Law Group

[57] ABSTRACT

A self-regulating exhaust gas boiler intended for the recovery of thermal energy from the exhaust gases of diesel engines or the like, has a steam/water cylinder acting as the water and steam space. There is a convection part acting as the vaporizer and being fitted in the vertical orientation between the steam/water cylinder and a lower cylinder, or the like, and connected to it. There is at least one downcomer interconnecting the steam/water cylinder and the lower cylinder, or the like. At least one valve or corresponding device regulates the amount of water and the water level in the convection part is mounted between the steam/water cylinder and the lower cylinder, or the like, preferably in the lower section of the downcomer. The preferably vertically disposed pipes of the convection part are partly filled with water, the power of the exhaust gas boiler being regulated by adjusting the water level in the convection part by means of a valve on the basis of the different heat transfer properties of water, a water-steam mixture, and steam. The valve can be continuously regulated and/or of the open/shut type. The pipe or pipes connecting the convection part to the steam/water cylinder can penetrate the mantle of the steam/water cylinder at a point above the highest permitted steam/water cylinder water level.

20 Claims, 2 Drawing Sheets

WASTE HEAT BOILER WITH VARIABLE OUTPUT

TECHNICAL FIELD

The invention relates to boilers, in particular steam boilers, recovering thermal energy from the exhaust gases generated by a diesel engine or a similar engine, and to the regulation of the power of said boilers.

BACKGROUND OF INVENTION

A conventional exhaust gas boiler is made up of a steam/water cylinder and a convection part, most commonly water-pipe-structured, recovering thermal energy. The pipes may be smooth or ribbed, and they are usually horizontally or vertically disposed. The water/steam cylinder acts as the storage container for the liquid to be fed to the convection part and for the steam generated therein. In addition, the exhaust gas boiler comprises a frame, a heat-insulated housing, inlet and outlet openings for exhaust gas, the necessary valves, piping, possibly collector pipes, pumps, control devices, safety devices, and a control panel. Before being fed into the boiler the water is treated by using boiler-water treatment devices and chemicals.

Exhaust gas boilers have most commonly been used on ships and in diesel power stations, in which operational reliability is of a very high importance. Partly for this reason, the systems in use seem simple and outdated in their technology. Furthermore, especially for ships, classification institutions control closely the systems used, and extensive and thorough test runs are carried out on new constructions, even for reasons of maritime safety. In cumbersome, deficient and severe operating conditions, the simplest solutions with respect to both regulation and other functions have proved best in terms of operational reliability. In the exhaust gas boilers of steam-generating diesel engines or the like, power regulation has usually been implemented by causing a portion of the exhaust gases to bypass the boiler, so-called bypass regulation, or by condensing any excess steam with a cooling substance such as water, air or the like, so-called condensation regulation. On the basis of their operating mode, the boilers have convention ally been classified into free-circulation boilers, in which the circulation is effected by gravity and by temperature differences, and forced-circulation boilers, in which the circulation is effected by means of a pump or a corresponding device. In forced-circulation boilers, a throttle valve, most commonly situated on the pressure side of the pump, has been used for power regulation, so called throttle regulation.

For bypass regulation it has been necessary to construct for the exhaust gas boiler a bypass, which is difficult to implement as a construction and expensive, since the arrangement additionally requires a regulating damper by means of which the exhaust gas flows are directed into the exhaust gas boiler and to bypass it. In order for the regulation properties to be good, the regulating damper should be double-acting, i.e. it should regulate the flows both to the boiler and to the bypass The use of two separate dampers is an expensive option. In practice, the option of one regulating damper has often been settled for, at the expense of the regulating properties and flaw resistances. The regulating damper has to operate it hot and soiling conditions, and thus the operational reliability will suffer. If the bypass flow of the boiler is increased, the flow velocity of the exhaust gases in the convection part is reduced. From this there follows the adhering of exhaust-gas soot, oil and other solids to the surfaces of the convection part; this weakens heat exchange, and in the worst case causes a fire.

In the condensation regulation system there is no need for an exhaust gas bypass or a regulating damper. Instead, for dumping the excess steam coming from the exhaust gas boiler there is needed a condenser, water and steam pipes, pumps and/or blowers, control valves, and regulators. The condenser may be either water-cooled or air-cooled.

In addition to the costs of investment, in the condensation regulation system there are incurred operating costs from the use of the pumps and/or blowers, in addition to which the cooling water may in some conditions be expensive, or a warm climate may require the increasing of the heat exchange surface of the air coolers and of the blower efficiency. Running at a constant power will also increase the boiler water treatment costs and the apparatus size. It can be deemed to be a good feature of the condensation regulation system that the exhaust gases have the highest possible flow velocity in the convection part, thus reducing soiling.

In forced-circulation exhaust gas boilers the pipes are often in a horizontal plane, and the pipes in different horizontal planes are interconnected by curved pipe parts, circulation occurring from one plane to another. Thereby sufficiently long pipes are obtained for the high velocities of the forced circulation, and there is time for vaporization to take place. A forced-circulation exhaust gas boiler can also be coupled so that pipes in one and the same horizontal level are connected to one another. In throttle regulation of an exhaust gas boiler, the flow is reduced in order to reduce the boiler power. When the flow velocity decreases sufficiently, water will be left lying on the bottom of horizontally disposed pipes and will form boiler scale as it boils dry. In some cases there may form separate steam pockets which, when discharging, may damage the boiler. When a forced-circulation exhaust gas boiler which has been run dry is being started, there forms a strong thermal shock, which will cause high thermal stresses and will strain the boiler.

FI patent publication No. 64978 discloses an exhaust gas boiler wherein the heat exchange surfaces of the convection part are made up of pipe coils made of smooth pipe. The boiler is cylindrical and the smoke ducts of the convection part are circular as seen from above and from below. The space left inside the innermost coil is used as a bypass duct in which also the silencer is situated. The regulating damper is an top of the bypass, and when it is closed, all exhaust gases will flow into the convection part. When the regulating damper is open, a portion o f the exhaust gas flow will travel via the convection part. Soiling is reduced by a smooth pipe structure. A regulating range of 0–100% is not achieved with the construction according to the FI patent. Owing to the smooth pipes, the thermal surfaces remain small and the boiler will be heavy in high power categories. It is best suited for high exhaust gas temperatures, i.e. for rapid diesel engines.

SUMMARY OF THE INVENTION

The object of the invention according to the present application is to provide a self-regulating exhaust gas boiler which is simple in construction and reliable in operation and does not include moving parts. The exhaust-gas bypass duct with a regulating damper is not necessary in the self-regulating exhaust gas boiler according to the present application. Since the self-regulating exhaust gas boiler according to the invention does not generate steam in amounts beyond consumption, a condenser with its auxiliary devices is not needed for the dumping of excess steam. The self-regulating exhaust gas boiler according to the invention operates with free, i.e. natural, circulation, in which case separate circulation pumps are not required. The entire exhaust gas flow always travels through the convection part, thus ensuring the best possible self-cleaning.

The self-regulating exhaust gas boiler according to the invention is based on the regulation of steam generation by regulating the water level in the convection part. This is made possible by the different heat transfer properties of the liquid phase and the steam phase. The steel boiler structure withstands the running of the exhaust gas boiler while dry, since the maximum temperature of the exhaust gases is approx. 350°.

More precisely, the self-regulating exhaust gas boiler according to the invention is characterized in what is stated in the characterizing clauses of the claims presented hereinafter.

In the self-regulating exhaust gas boiler, the water level in the pipes, which are preferably vertically disposed, is regulated by means of at least one regulable valve in connection with the downcomer or downcomers of the steam/water cylinder. In the self-regulating exhaust gas boiler any superheated steam possibly emerging from the convection part is cooled by means of feed water by using steam guide baffles, the feed water being directed to an area inside the baffles by means of perforated and/or ribbed pipes, and/or by directing the steam to the water surface or under the water surface. The water level in the steam/water cylinder of the self-regulating exhaust gas boiler is adjusted to a constant level or is allowed to vary between an upper limit and a lower limit. The regulation of the water level can be effected by means of a separate independent control circuit. The valve regulating the water level in the convection part is controlled by means of the pressure, temperature and/or flow or corresponding quantities of the main steam line or the steam/water cylinder. The convection part may be made up of smooth or ribbed pipes; also a sheet structure or a combination of the foregoing is possible. A plurality of exhaust gas boilers can be coupled to a common steam/water cylinder, whereby a minimum will be reached in the number of feed-water pumps and water-level regulation. The raising of the steam/water cylinder to a higher level improves static pressure and speeds up regulation. The exhaust gas flow through the self-regulating exhaust gas boiler travels in its entirety through the convection part.

The invention provides highly significant advantages. The regulation of the self-regulating exhaust gas boiler is virtually foolproof, and it is equally suited for the oceans and the jungle. Spare parts possibly needed, such as pressostats and thermometers, are available all over the world. The self-regulating exhaust gas boiler is also simple to run manually. The investment costs and the operating costs are reduced, since neither condensers nor bypass ducts are required. The usability of the self-regulating exhaust gas boiler is also improved by the possibility of designing the exhaust gas boiler for the maximum flow velocity, in which case the self-cleaning of the convection surfaces will be the best possible while the flow velocities remain almost constant. By means of a vertical pipe construction it is possible to reduce the formation of boiler scale, and with cautious running and careful operation it is almost entirely eliminated. Blowing can be arranged for the lower cylinder and the surface of a free-circulation boiler, and thereby the usability and useful life of the self-regulating exhaust gas boiler can be improved.

BRIEF DESCRIPTION OF THE DRAWINGS

The invention is described below in greater detail with the help of the accompanying drawings.

DETAILED DESCRIPTION OF THE INVENTION

Figure 1:
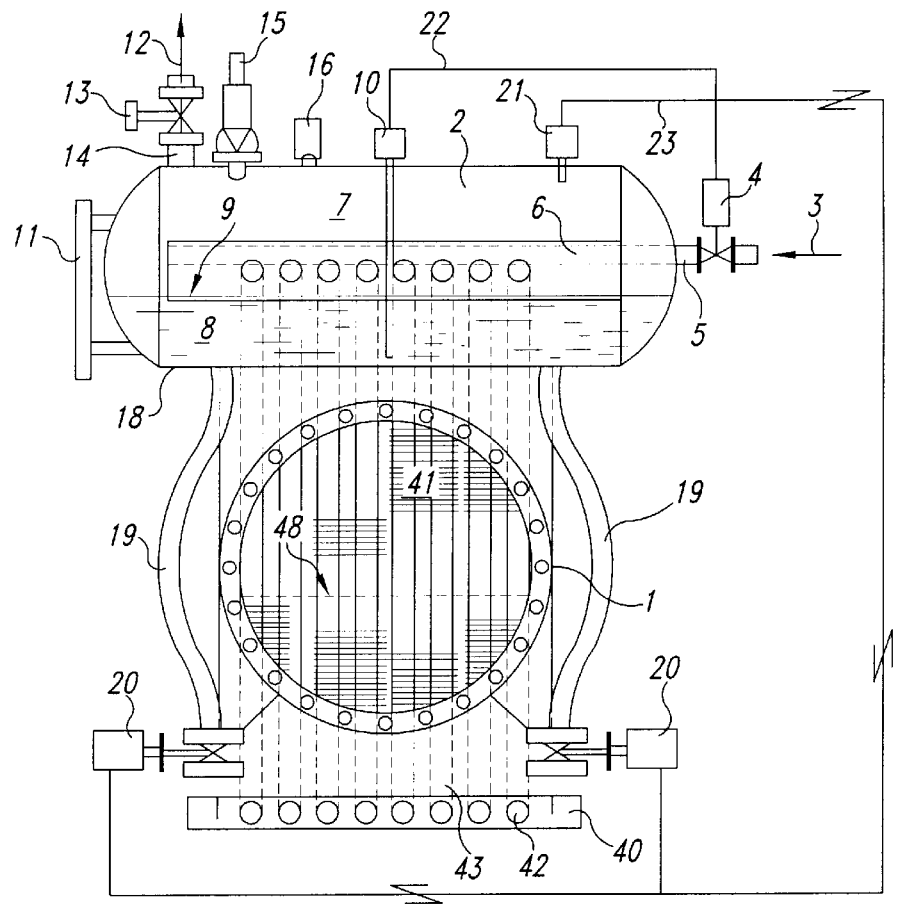
FIG. 1 depicts schematically a front elevation of one embodiment of the self-regulating exhaust gas boiler.
Figure 2:
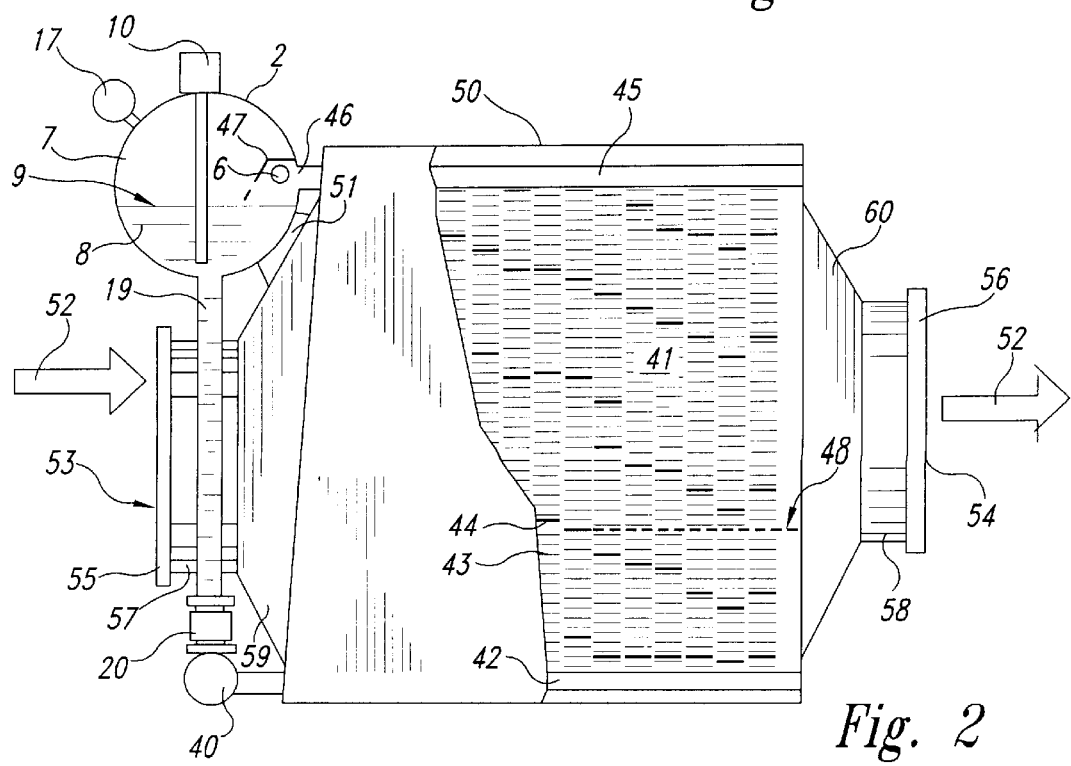
FIG. 2 depicts a side elevation of the self-regulating exhaust gas boiler of FIG. 1, partly in cross-section.

In FIGS. 1 and 2, the storage container for the feed water and steam of the self-regulating exhaust gas boiler is a steam/water cylinder 2. The feed-water flow 3 comes from water treatment devices and is regulated by means of a valve 4. A pipe 5 directs the feed water to a distributor pipe 6 inside the steam/water cylinder 2. The aim in the design of the distributor pipe 6 is that heat exchange between the steam 7 and the feed water 8 should be as advantageous as possible. The feed-water level 9 in the steam/water cylinder 2 is regulated by means of a regulator 10, from which, for example, an electric signal is transmitted via wires 22 to the valve 4 or, for example, the feed-water pipe. The regulation may be continuous or lower limit/upper limit regulation. Visually the water level 9 can be monitored by means of monitoring vials 11. The steam flow 12 produced by the self-regulating exhaust gas boiler 1 is regulated by means of a main steam valve 13, which is mounted in a main steam pipe 14 connected to the steam/water cylinder 2. The safety devices of the self-regulating exhaust gas boiler 1 include safety valves 15, which release excess pressure from the boiler; an underpressure guard 16, which prevents the formation of underpressure in the boiler upon cooling; and a pressure gauge 17 indicating the pressure prevailing in the boiler.

To the lower section of the mantle 18 of the steam/water cylinder 2 there are connected downcomers 19, in which there are mounted regulating valves 20. The pressostat 21 measuring the pressure in the steam/water cylinder 2 controls the valves, for example, by means of an electric signal via wires 23, or the valves 20 may also be self-actuated, controlled directly by the steam 7 pressure, temperature, or the like.

The downcomers 19 are connected to a lower cylinder 40, which distributes the feed water 8 to convection-part 41 lower distributor pipes 42, to which there are attached vertical pipes 43. Heat exchange is by mediation of the vertical pipes 43, which may be either smooth or ribbed 44 in order to improve their heat exchange properties. The pipes of the convection part 41 may also be replaced by sheet structures. The upper ends of the vertical pipes 43 are connected to upper collector pipes 45, which direct the steam 7 to the steam/water cylinder 2 and are attached by their other ends to its mantle 18. The steam 7 entering the steam/water cylinder via openings 46 is directed by a baffle 47 to heat the feed water 8 in the distributor pipe 6 and/or the feed water 8 cools the superheated steam 7 The water level 48 in the convection part 41 determines the power of the self-regulating exhaust gas boiler 1, The convection part 41 of the self-regulating exhaust gas boiler 1 can be suspended by its upper section to the frame 50, and the steam/water cylinder 2 can be attached to it, for example, by mediation of supports 51. The exhaust gas flow 52 travels in its entirely via inlet and outlet openings 53 and 54 through the convection part 41. By means of flanges 55 and 56, the self-regulating exhaust gas boiler 1 is coupled, for example, to the exhaust-gas duct of a diesel engine.

Cylinders 57 and 58, or the like, connected to the flanges 55 and 56 are connected by mediation of cones 59 and 60 to the frame 50. The exterior surfaces (50, 57, 58, 59, 60) of the self-regulating exhaust gas boiler are usually thermally insulated for the sake of energy economy and in order to lower the surface temperature for reasons of occupational safety.

Figure 3:
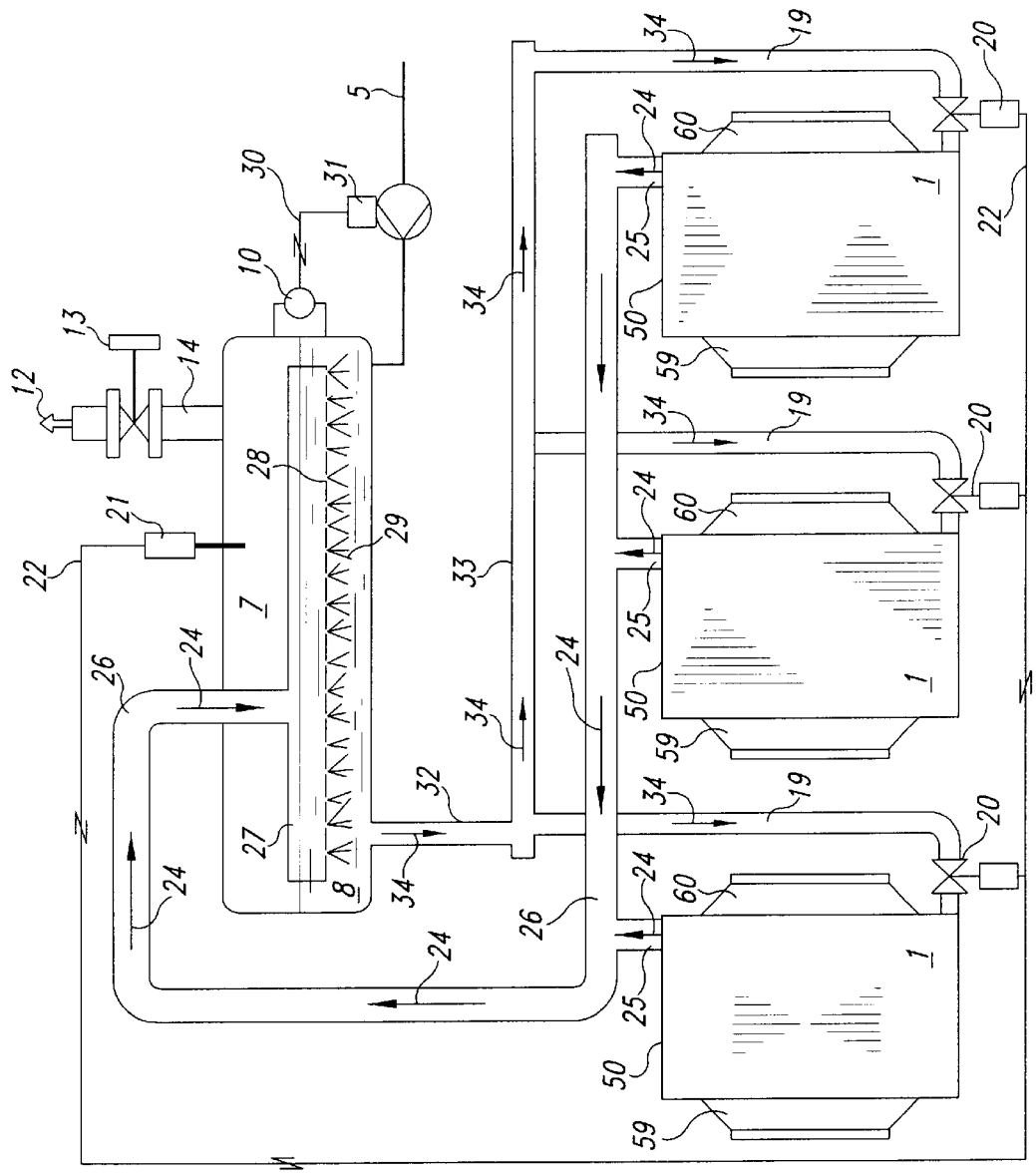
FIG. 3 depicts schematically a coupling in which a plurality of exhaust gas boilers have been coupled to a common steam/water cylinder.

FIG. 3 depicts an embodiment in which three separate self-regulating exhaust gas boilers 1 are coupled to a common steam/water cylinder 2. Arrows 24 indicate the travel of the steam 7. Steam pipes 25 or upper collector pipes 45 coming from the separate exhaust gas boilers 1 are connected to a connecting steam pipe 26 leading to the steam/water cylinder 2. A steam 7 collector pipe system of some other type is, of course, also possible, or the self-regulating exhaust gas boilers 1 are coupled directly to the steam/water cylinder 2 by mediation of upper collector pipes 45 or directly. In the embodiment of FIG. 3, the connecting steam pipe 26 is directed from above to the steam/water cylinder 2 through the mantle 18, and it is connected to a perforated steam distributor pipe 27, which is situated in part or entirely below the surface 9 of the feed water 8. Thereby feed water 8 is heated and superheated steam 7 is saturated. The steam jets 29 discharging through perforations 28 are effectively mixed with the feed water 8. The water level regulator 10 controls via a wire 30 a pump 31 in the feed-water pipe 5. In this embodiment, the pipe 5 leads directly to the steam/water cylinder 2. The upper end of the downcomer 32 is attached to the lower section of the mantle 18 of the steam/water cylinder 2 and its lower end is attached to a manifold 33, to which the downcomers 19 of the separate exhaust gas boilers 1 are coupled. The water level in the convection parts 41, as well as in the individual boilers 1, is regulated by means of valves 20. The flow of feed water 8 to the self-regulating exhaust gas boilers is indicated by arrow 34.

The self-regulating exhaust gas boiler 1 according to the invention works as follows. The exhaust gas flow 52 from a diesel engine or the like is not regulated in any way; it flows in its entirety through the convection part 41, keeping the heat exchange surfaces clean owing to its high flow velocity. In the vertical pipes 43 of the convection part 41 the liquid to be vaporized is on the inside and the exhaust gas is on their outside. In order to enhance heat exchange, the pipes are usually ribbed on the gas-flow side. When the valve 13 of the main steam line 14 is opened either manually or under control of a target of use, the pressure and temperature in the steam/water cylinder 2 decrease, and the valve 20 is opened under the control of a pressostat 21, a thermostat, or directly under the control of the steam 7 pressure, temperature or the like, whereupon feed water 8 will flow under gravity via the downcomer 19 to the convection part 41 and will raise the water level 48. The generation of steam 7 increases, since the transfer of heat by water and a water-steam mixture is considerably better than that by steam. The steam above the water surface 48 superheats the more the lower the power at which the exhaust gas boiler is run, since at low powers the water level 48 is low and the superheating surface increases. The valve 20 can be regulated as a continuous-working or an on/off type, depending on the targets of use of the steam, which determine the speed and precision of the regulation. The speed of the regulation can be increased by increasing the number and/or diameter of the downcomers. Also by a raising of the steam/water cylinder 2 to a higher level, as shown in FIG. 3, the static pressure of the feed water 8 can be increased and thereby the power regulation speed can be improved. The level 9 of the feed water 8 in the steam/water cylinder 2 can also be regulated by continuous regulation or controlled by upper and lower limits. The regulation of the water level 9 can also be implemented completely independently by controlling the operation of the pump 31 and/or the valve 4. In terms of stable operation of the self-regulating exhaust gas boiler 1 it is important that the super-heating heat of the superheated steam can be transferred to the feed water. The surface 9 of the feed water 8 acts to some extent as a heat exchange surface, but it is not sufficient. Therefore efforts are made to enhance heat exchange by means of various perforated and ribbed pipe systems or by directing the steam 7 to the surface 9 or under it. Heat exchange can also be enhanced by means of various steam or water jets.

The regulation of the water level 9 in the steam/water cylinder serves to prevent overfilling. When the self-regulating exhaust gas boiler is run at zero power, feed water 8 may be left only on the bottom of the lower cylinder 40, where it is possible to arrange exit blowing. Surface blowing in the steam/water cylinder 2 can also be easily arranged owing to the water surface 9 regulation.

The invention of the present application is not limited only-to the constructions and embodiments presented above. Thus, for example, the construction of the convection part 41 may vary according to the pipes available. The ribbing may be spiral or longitudinal. Various combinations of upper collector pipes and lower distributor pipes can be used, or they may be entirely omitted. The steam/water cylinder 2 may be of another shape or its disposition may be different. Also, the heating of the feed water 8 by means of partly superheated steam 7 can be implemented in many different ways. For a person skilled in the art, the use of numerous control devices and operating within the inventive idea is also clear.

What is claimed is:

1. A self-regulating exhaust gas boiler for the recovery of thermal energy from exhaust gases of diesel engines, the boiler comprising:

a steam/water cylinder acting as a water and steam space; a convection part adapted to receive the exhaust gas from the diesel engine, the convection part acting as a vaporizer and being fitted in a vertical orientation below the steam/water cylinder and connected between the steam/water cylinder and a lower cylinder; and at least one downcomer interconnecting the steam/water cylinder and the lower cylinder;

at least one flow regulation device configured to regulate an amount of water and a water level in the convection part, the flow regulation device being mounted between the steam/water cylinder and the lower cylinder; and the convection part having generally vertically disposed pipes partly filled with water, the flow regulation device being controllable to selectively adjust the power of the exhaust gas boiler by adjusting the water level in the convection part the power changing on the basis of the different heat transfer properties of water, a water-steam mixture, and steam.

2. The self regulating exhaust gas boiler according to claim 1, wherein the flow regulation device is one of a continuously regulated type and an open/shut type.

3. The self-regulating exhaust gas boiler according to claims 1 or 2, wherein at least one pipe connecting the convection part to the steam/water cylinder penetrates a mantle of the steam/water cylinder at a point above the highest permitted steam/water cylinder water level.

4. The self-regulating exhaust gas boiler according to claim 3, wherein inside the steam/water cylinder is mounted a smooth or ribbed perforated distributor pipe in front of steam openings in the mantle of the steam/water cylinder behind a regulating damper in order to condense steam superheated in the convection part and to heat the feed water.

5. The self-regulating exhaust gas boiler according to claim 1, further comprising a perforated steam distributor pipe mounted in the steam/water cylinder at least partially below the water level in order to condense the steam superheated in the convection part and to heat the feed water.

6. The self-regulating exhaust gas boiler according to claim 1, further comprising a separate, independent control circuit by means of which the water level in the steam/water cylinder is regulated by one of a continuous regulation and a lower limit/upper limit regulation.

7. The self-regulating exhaust gas boiler according to claim 1, wherein the flow regulation device is fitted to act under the control of at least one of steam pressure, temperature, flow rate, and a corresponding measurable quantity, so as to regulate the water level in the convection part.

8. The self-regulating exhaust gas boiler according to claim 1, wherein the pipes of the convection part are one of ribbed pipes and smooth pipes, with the pipes being replaceable by a sheet construction.

9. The self-regulating exhaust gas boiler according to claim 1, wherein an exhaust gas flow running through the self-regulating exhaust gas boiler travels in its entirety through the convection part.

10. The self-regulating exhaust gas boiler according to claim 1, further comprising a plurality of regulable exhaust gas boilers coupled to a common steam/water cylinder under the control of which the separate regulable exhaust gas boilers operate.

11. A self-regulating boiler for recovering thermal energy from an exhaust gas stream of a diesel engine, the boiler comprising:

a heat exchanger adapted to receive the exhaust gas stream from the diesel engine, the heat exchanger being configured to retain a variable amount of water at a variable water level to be heated and vaporized by the exhaust gas passing through the heat exchanger;

an upper container adapted to retain a mixture of steam and liquid water, the upper container being located above the heat exchanger and being in fluid communication with the heat exchanger;

a lower container adapted to retain liquid water and to distribute the liquid water to the heat exchanger, the lower container being in fluid communication with the heat exchanger;

a coupling in fluid communication between the upper and lower containers, the coupling being located external to the heat exchanger; and at least one fluid flow regulator located on the coupling between the upper and lower containers, the fluid flow regulator being controllable to selectively allow fluid from the upper container to pass under the force of gravity to the lower container to regulate the amount of water and the water level in the heat exchanger and thereby control the power of the boiler.

12. The self-regulating boiler of claim 11 wherein the fluid flow regulator is a valve.

13. The self-regulating boiler of claim 11 wherein the fluid flow regulator is a control valve.

14. The self-regulating boiler of claim 11 wherein a steam pipe connects the heat exchanger to the upper container, the steam pipe penetrating the upper container at a location above a highest permitted water level.

15. The self-regulating boiler of claim 14 further comprising a feed water supply line projecting into the upper container, the feed water supply line located to at least partially obstruct a path of steam emanating from the steam pipe such that a portion of the steam emanating from the steam pipe condenses on the feed water supply line and the steam emanating from the steam pipe heats a stream of feed water in the feed water supply line.

16. The self-regulating boiler of claim 11 wherein a steam pipe connects the heat exchanger to the upper container, the steam pipe projecting into the upper container at least partially below a water level in the upper container to condense the superheated steam from the heat exchanger and to heat the water in the upper container.

17. The self-regulating boiler of claim 11 further comprising a control circuit controllable to regulate a water level in the upper container by one of a continuous regulation and a lower limit/upper limit regulation.

18. The self-regulating boiler of claim 11 wherein the fluid flow regulator is configured to operate under the control of at least one of steam pressure, temperature, flow rate, and a corresponding measurable quantity, so as to regulate the water level in the heat exchanger.

19. The self-regulating boiler of claim 11 further comprising a plurality of regulable exhaust gas boilers coupled to a common upper container under the control of which the separate regulable exhaust gas boilers operate.

20. A method of regulating a boiler power comprising:

coupling a heat exchanger between an upper container containing a mixture of steam and water, and a lower container containing water;

filling the heat exchanger with sufficient liquid water to create a water level in the heat exchanger;

passing a stream of heated exhaust gas from a diesel engine through the heat exchanger to generate steam from the liquid water in the heat exchanger;

coupling the upper container to the lower container;

controlling the flow of water from the upper container to the lower container to selectively change the water level in the heat exchanger and, thus, change the power of the boiler based on the different heat transfer properties of water, a water-steam mixture, and steam.

* * * * *